United States Patent [19]

Cipolla

[11] Patent Number: 4,597,264
[45] Date of Patent: Jul. 1, 1986

[54] REGULATION DEVICE FOR A TURBO COMPRESSOR UNIT FOR SUPERCHARGING AN INTERNAL COMBUSTION ENGINE

[75] Inventor: Giovanni Cipolla, Turin, Italy
[73] Assignee: Fiat Auto S.p.A., Italy
[21] Appl. No.: 555,837
[22] Filed: Nov. 28, 1983
[30] Foreign Application Priority Data Dec. 14, 1982 [IT] Italy ............... 68463 A/82

[51] Int. Cl.$^4$ ............... F02B 37/12
[52] U.S. Cl. ............... 60/602
[58] Field of Search ............ 60/600, 601, 602, 603, 60/289

[56] References Cited

U.S. PATENT DOCUMENTS

| | | | |
|---|---|---|---|
| 3,818,702 | 6/1974 | Woo | 60/307 |
| 4,099,377 | 7/1978 | Yoshimura | 60/289 |
| 4,174,617 | 11/1979 | Jalali-Karchay | 60/602 |
| 4,292,806 | 10/1981 | Moore | 60/600 |
| 4,423,713 | 1/1984 | Sami | 123/357 |
| 4,449,367 | 5/1984 | Moriguchi | 60/602 |
| 4,461,149 | 7/1984 | Suzuki | 60/602 |
| 4,466,248 | 8/1984 | Nartowski | 60/602 |
| 4,467,606 | 8/1984 | Chaffiotte | 60/602 |

FOREIGN PATENT DOCUMENTS 3106579 9/1982 Fed. Rep. of Germany ....... 60/602

Primary Examiner—Douglas Hart
Attorney, Agent, or Firm—Andrus, Sceales, Starke & Sawall

[57] ABSTRACT

A device for regulating the supercharging of an engine, of the type provided with a pressure limiting valve disposed in a branch of the supply duct of a turbine of the turbo compressor unit and operable to regulate the flow rate of gas supplied to the turbine. The valve is pneumatically controlled by means of an actuator which detects the pressure difference between a first and a second chamber. The first chamber is connected to the atmosphere and the second chamber is connected with valve means for alternatively connecting this latter to the atmosphere and to an accumulator maintained at a substantially constant pressure different from atmospheric pressure, and for fluid tight sealing the second chamber, in such a way as to determine and then maintain in it a control pressure the value of which is variable continuously between that of the atmospheric pressure and that of the pressure in the said accumulator.

13 Claims, 2 Drawing Figures

REGULATION DEVICE FOR A TURBO COMPRESSOR UNIT FOR SUPERCHARGING AN INTERNAL COMBUSTION ENGINE

BACKGROUND OF THE INVENTION

The present invention relates to a device for regulating a turbo compressor unit for supercharging an internal combustion engine, of the type comprising a pressure limiting valve disposed in a branch of the supply duct for the turbine to discharge a part of the exhaust gas upstream of the turbine itself. It is known that in engines supercharged by means of turbo compressors the supply pressure increases with an increase in the speed of the engine. To avoid mechanical and thermal overloads on the engine at high speeds it is therefore necessary to provide means for automatically intervening to limit the supercharging pressure to a predetermined maximum value. The most usual method is to arrange a pressure limiting valve or "waste-gate" valve upstream of the turbine, such valve being operable to discharge upstream of the turbine a part of the exhaust gas directed towards the turbine from the engine. The intervention of the "waste-gate" valve can be controlled either by the supercharging pressure or by the turbine supply pressure; both act on a membrane which causes opening of the valve against the action of a calibrated spring, upon achievement of the predetermined pressure.

The system described is not free from disadvantages. In particular, in the case of a "waste-gate" controlled by the supercharging pressure, the system presents a high back-pressure at the exhaust, which increases with the speed of the engine, and which causes the disadvantage of a high fuel consumption. In the case of a limiting valve controlled by the turbine supply pressure, on the other hand, there is the dual disadvantage of a reduction in the supercharging pressure at high speeds and an inability of the turbo compressor to intervene during rapid accelerations during which a high supercharging would be very useful. To overcome, in part, such disadvantage a parallel control system or "overboost" of the limiting valve has already been proposed, which excludes the valve itself during accelerations by an electrically controlled valve operated by a switch and a timer connected to the accelerator pedal.

SUMMARY OF THE INVENTION

The object of the present invention is that of providing a regulation device for a turbo compressor unit for supercharging an internal combustion engine, of the type comprising a pressure limiting valve such as that described, but free from the said disadvantages. A further object of the invention is that of providing a regulation device of the said type which is capable of regulating the value of the supercharging pressure as a function of the speed and load conditions of the engine.

The said objects are achieved by the present invention in that it relates to a regulation device for a turbo compressor unit for supercharging an internal combustion engine, of the type comprising a pressure limiting valve disposed in a branch of a supply duct for the turbine of the said turbo compressor unit and operable to regulate the rate of flow of exhaust gas from the said engine supplied to the said turbine, the said pressure limiting valve being pneumatically controlled by the pressure difference between two separate chambers by an actuator connected with a stem of the said valve, characterised by the fact that a first of the said two chambers is permanently connected to the atmosphere in such a way as to be maintained at atmospheric pressure, and a second of the said two chambers is connected with valve means for connecting the said second chamber alternatively with the atmosphere at atmospheric pressure and with an accumulator maintained at a substantially constant pressure different from atmospheric pressure, and for substantially fluid-tight sealing the said second chamber, in such a way as to determine and then maintain in it a control pressure the value of which is continuously variable between that of the said atmospheric pressure and that of the said substantially constant pressure existing in the said accumulator.

BRIEF DESCRIPTION OF THE DRAWINGS

For a better understanding of the present invention there will now be given a non limitative description of possible embodiments with reference to the attached drawings, in which.

DETAILED DESCRIPTION OF THE INVENTION

Figure 1:
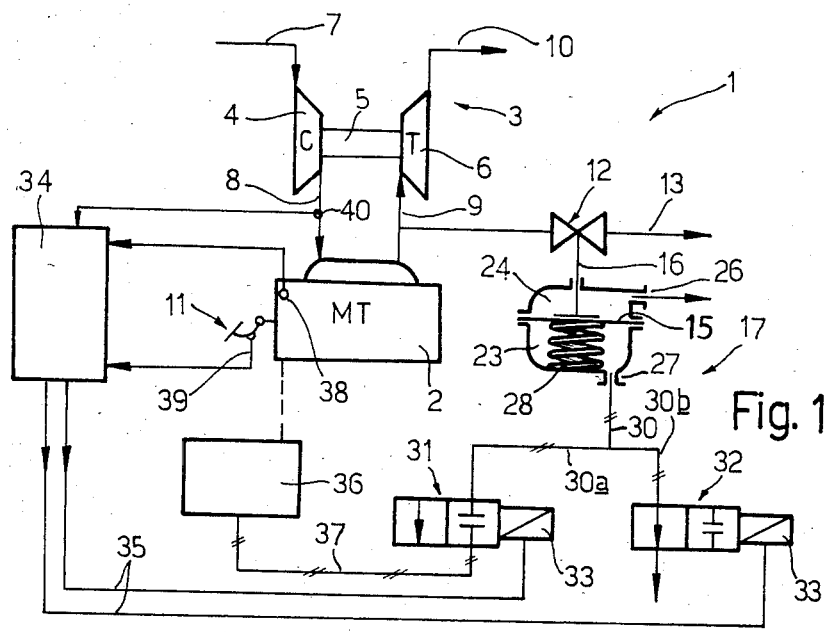
FIG. 1 schematically illustrates a supercharging system including a turbo compressor regulation device formed according to the principles of the present invention.

With reference to FIG. 1, the reference numeral 1 generally indicates a system for supercharging an internal combustion engine 2, either a diesel engine or a spark-ignition engine, by means of a turbo compressor unit 3 including a compressor 4 connected by means of a shaft 5 to a turbine 6 operated by the exhaust gas of the engine 2. The compressor 4 draws air under atmospheric pressure in through an induction duct 7, compresses it and sends it at a determined pressure (supercharging pressure) to the engine 2 through a supply duct 8 thereof. The combustion gases are exhausted from the engine 2 through an exhaust manifold 9 which supplies the turbine 6 in which the gases further expand and from which they are then discharged to the atmosphere through a duct 10. The operating point of the engine 2 (power, speed of rotation, torque, etc.,) is controlled by the user of the vehicle not illustrated on which the engine 2 is mounted (or of the system, not illustrated, for example generating electricity, of which the engine 2 forms part) via an accelerator 11, for example an accelerator pedal. It is obvious that by increasing the speed of operation of the engine the speed of revolution of the turbo compressor increases and therefore the supercharging pressure increases. To avoid dangerous overloads the system 1 is provided with a pressure limiting or "waste-gate" valve 12 which serves to regulate the speed of operation of the turbo compressor 3 and therefore the value of the supercharging pressure.

The valve 12 is connected in a branch 13 of the exhaust manifold 9 disposed upstream of the turbine 6 and is operable to discharge directly to the atmosphere the combustion gases emitted by the engine 2. The valve 12 is able to assume a plurality of positions of opening, in which it regulates the rate of flow of exhaust gas through the branch 13, and to assume a closed position in which it closes the branch 13 in a fluid-tight manner thus directing all the exhaust gas produced by the engine 2 through the turbine 6; in this way, by regulating the flow rate through the branch 13 the flow rate of gas which traverses the turbine 6, and therefore the energy supplied thereto for operating the compressor 4 is consequently regulated.

The valve 12, which therefore acts substantially as a "by-pass" valve, forms part of a regulator device 17 of the turbo compressor 3 and is schematically illustrated. It is of known type and is therefore only described in outline. The valve 12 is of pneumatic type and includes an actuator 15 which, in the illustrated example, is constituted by a deformable membrane which actuates a stem 16 for controlling the valve 12. The actuator 15 delimits and separates two chambers 23 and 24 in a fluid-tight manner; the chamber 24 is connected to atmosphere by means of a hole 26, whilst the chamber 23 is able to receive a control pressure through an inlet connector 27 and is provided with a spring 28 operable to oppose the movements of the stem 16.

The inlet connector 27 is connected to a pneumatic line 30 which splits into two branches 30a and 30b leading to respective electrically operated two-way valves 31 and 32 respectively, operated by magnetic actuators 33 controlled by a regulator device constituted, in the illustrated example, by an electronic control unit 34 connected to the electromagnets 33 by means of two electrical lines 35. The valves 31 and 32 can act to connect the chamber 23 alternatively with the external environment at atmospheric pressure or else to an accumulator 36 connected to the valve 31 via a tube 37, and maintained at substantially constant pressure different from atmospheric pressure; the valves 31 and 32 are likewise operable to seal the chamber 23 in a substantially fluid-tight manner, by interupting any communication between the branches 30a and 30b and, respectively, the tube 37 and the external environment.

In particular, in the example illustrated in FIG. 1, the accumulator 36 is constituted by the reservoir of a braking system, not illustrated, with a vacuum braking servo, in which there exists a pressure lower than atmospheric pressure. This solution is particularly suitable for vehicles in which the engine 2 is a diesel engine. If the engine 2 is a spark-ignition engine (Otto cycle) the accumulator 36, in which there is always a pressure lower than atmospheric pressure, is preferably constituted by the induction manifold of the engine 2. The electrically operated valve 31 can assume two different working positions in the first of which, not illustrated, it connects chamber 23 with the accumulator 36 and a second of which, illustrated in FIG. 1, it isolates the chamber 23 from the accumulator 36. Similarly, the electrically operated valve 32 can assume two different working positions in a first of which, illustrated in FIG. 1, it connects the chamber 23 with the atmosphere, and in a second of which, not illustrated, it isolates the chamber 23 from the atmosphere. It is clear that when both the valves 31 and 32 are closed and the chamber 23 is isolated both from the accumulator 36 and from the atmosphere, there can be maintained in it any pressure lying between that existing in the accumulator 36 and atmospheric pressure, preliminarily obtained by opening and closing both the electrically operated valves 31 and 32 alternatively for suitable times in such a way as to cause a sucession of transitory pressures in the chamber 23, which can be modulated continuously between the values of atmospheric pressure and the pressure in the accumulator 36. These transitory pressures, which can be obtained and then maintained in the chamber 23 by suitably operating the valves 31 and 32, also constitute control pressures for the valve 12 to vary its degree of opening. The valve 12 will, therefore, obviously close, whatever the speed of the engine, when the chamber 23 communicates with the atmosphere through the electrically operated valve 32, whilst it will become gradually open when the control pressure determined in the chamber 23 by the opening and closing of the valves 31 and 32 approaches the pressure in the accumulator 36 until it remains completely open when the electrically operated valve 31 continuously connects the chamber 23 and the accumulator 36.

The regulator element, which controls the valves 31 and 32 and, therefore, controls the degree of opening of the valve 12, is constituted by the control unit 34 which is able to determine in the chamber 23 the control pressure which is a linear function of the degree of opening of the valve 12. In particular, the control unit 34 is able to send electrical signals on the lines 35 for the operation of the magnets 33 according to a predetermined function and on the basis of suitably processed input data which the control unit 34 receives from suitable sensors operable to detect at least two operating parameters of the device 17 and including at least two sensors 38 and 39 operable, respectively, to detect the speed of rotation of the engine 2 and the position of the accelerator 11. Furthermore, a sensor 40 is operable to detect the value of the supercharging pressure in the duct 8, which obviously depends on the degree of opening of the valve 12, and which is utilised as a "feed-back" parameter for the control system 17. The central control unit 34 includes means, not illustrated for simplicity, for regulating the degree of opening of the valve 12 in such a way as to minimise the specific fuel consumption of the engine 2, or else the emission of nitric oxides and/or of unburnt hydrocarbons therefrom according to a priority which can be established either by the manufacturer or else by the user of the vehicle on which the device 17 is mounted.

The operation of the device 17 is as follows. In stationary operating conditions of the unit comprising the engine 2 and the turbo compressor 3, the actuation of the "waste-gate" valve 12 is controlled by the central control unit 34 in such a way as to avoid overloads of the engine 2 at high speeds. As distinct from known systems, however, the value of the super-charging pressure can be continuously controlled, utilising different super-charging pressures at different load conditions of the engine 2. It is in fact sufficient for the central control unit 34 to excite the magnets 33 in such a way as to put the chamber 23 alternatively and transitionally in communication either with the accumulator 36 so as to bring the vacuum into it and make the valve 12 open, or with the external environment through the valve 32 so as to adjust the depression in the chamber 23 by the introduction of air from the atmosphere. Upon achieving the desired depression in the chamber 23, corresponding to a determined value of opening of the valve 12 and to a determined super-charging pressure detected by the sensor 40, the central control unit 34 closes both the valves 31 and 32, thereby maintaining in the chamber 23 the desired control pressure and, therefore, the desired value of opening of valve 12.

During transients (accelerations and decelerations) it is moreover possible to make use of the turbo compressor 3 to improve the speed of response of the engine 2. During accelerations, detected by the sensors 39 and 38, the central control unit 34 cuts off the valve 12 by putting the chamber 23 permanently in communication with the external environment at atmospheric pressure;

therefore the valve 12 remains closed and the supercharging pressure can rise temporarily to levels greater than normal during the acceleration transient, reducing the acceleration times and the fuel consumption. During decelerations, on the other hand, the valve 12 is also maintained closed by leaving the valve 32 open in such a way as to cause a strong exhaust back pressure due to the turbine 6, which increases the engine-braking effect on the vehicle.

Figure 2:
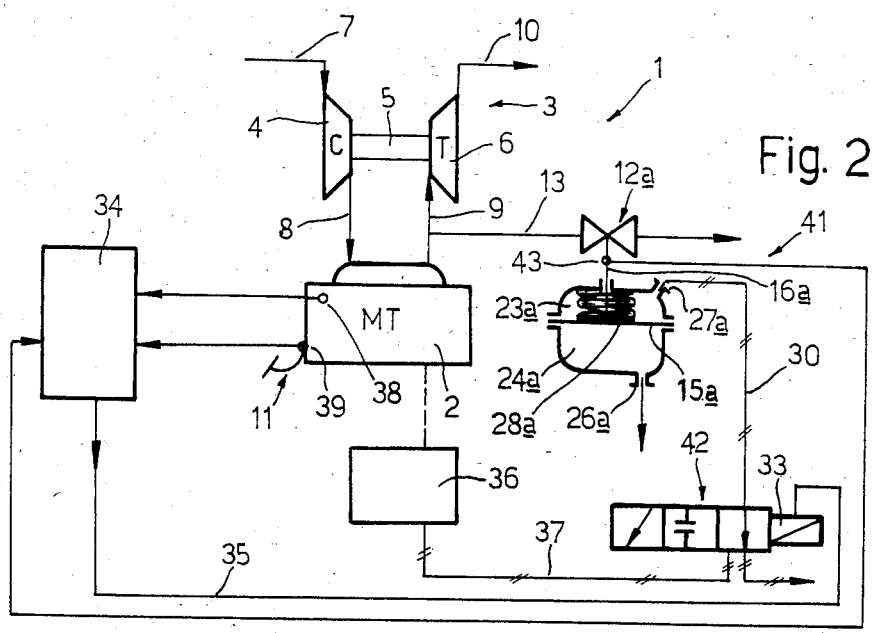
FIG. 2 illustrates a variant of the device of FIG. 1.

With reference to FIG. 2 there is illustrated a system entirely similar to that of FIG. 1 and device 17. The features similar or identical to those already described are indicated with the same reference numerals. The device 41 differs from the device 17 in that it uses a pressure limiting valve 12a of known type which differs from the valve 12 in the position of the spring. The valve 12a is disposed in series in the exhaust branch 13. A tube connector 27a connects a chamber 23a to a pneumatic line 30 which terminates in a 3-way electrically operated valve 42, which replaces the two electrically operated valves 31 and 32 and is actuated by an electromagnet 33 controlled, via an electric line 35, by a central electronic control unit 34 entirely identical to that of FIG. 1. The central control unit 34 receives, as in the example of FIG. 1, input data from sensors 38 and 39 operable to detect the speed of rotation of the engine 2 and the position of the accelerator 11, and from a sensor 43 which replaces the sensor 40 and which directly detects the position of a stem 16a of the valve 12a and therefore its degree of opening. The valve 42 can assume three working positions in the first of which it maintains the chamber 23a closed in a fluid-type manner isolating the line 30 from communication with the external environment and in the second of which, illustrated in FIG. 2, it connects the line 30 and the chamber 23a with the environment at atmospheric pressure, and in a third of which it connects the line 30 and the chamber 23a with a tube 37 and with an accumulator 36 at constant pressure which, in the example of FIG. 2 is constituted by a reservoir of a compressed air-braking system, not illustrated. In this case a pressure greater than atmospheric pressure exists in the accumulator 36.

The operation of the device 41 is entirely similar to that of the device 17 already described.

From the description the advantages of the present invention are apparent and it is clear that variations and modifications to the device described can be introduced without departing from the scope of the present invention. In particular, it is obvious that the single electrically operated valve 42 can also be used in the system of FIG. 1 in place of the valves 31 and 32. The pneumatic connections and the position of the spring (28 and 28a) of the valves 12 and 12a depends on the value of the pressure available in the accumulator 36, or rather on the type of application (motor vehicle fixed installation, lorries etc). Finally, the sensor 43 can be used equally in place of sensor 40 and vice-versa, in both the systems of FIGS. 1 and 2.

I claim:

1. A device for regulating a turbo compressor unit (3) for supercharging an internal combustion engine (2), comprising:
   (a) a turbine (6) forming part of said turbo compressor unit (3),
   (b) a supply duct (9) connected to supply exhaust gas from said engine (2) to said turbine (6),
   (c) said supply duct (9) having a branch (13) connected to atmosphere,
   (d) a pneumatic pressure limiting valve (12, 12a) disposed in said branch (13) and operative to regulate the rate of flow of exhaust gas through said supply duct (9),
   (e) said pressure limiting valve (12, 12a) being connected to a unit forming two chambers (23, 24; 23a, 24a) therein,
   (f) an actuator (15, 15a) separating said two chambers (23, 24; 23a, 24a),
   (g) a stem (16, 16a) connecting said pressure limiting valve (12, 12a) with said actuator (15, 15a) so that a pressure difference between said two chambers (23, 24; 23a, 24a) causes said actuator (15, 15a) to move said stem (16, 16a) to thereby control said pressure limiting valve (12, 12a),
   (h) a first (24, 24a) of said two chambers being permanently connected to atmosphere so that said first chamber (24, 24a) is maintained at atmospheric pressure,
   (i) valve means (31, 32; 42) connected to the second (23, 23a) of said two chambers, and with said valve means having a portion connectable to atmosphere,
   (j) an accumulator (36) connected to a portion of said valve means and with said accumulator (36) being maintained at a substantially constant pressure different from atmospheric pressure,
   (k) and control means (34) connected to actuate said valve means (31, 32; 42) for:
      (1) connecting said second chamber (23, 23a) alternatively to atmospheric pressure and to said accumulator (36) at said constant pressure different from atmospheric pressure to provide a succession of transitory pressures within said second chamber (23, 23a), and for
      (2) fluid-tight sealing said second chamber (23, 23a) so that a control pressure is created and maintained therein which is continuously variable between the value of said atmospheric pressure and the value of said constant pressure existing in said accumulator (36).

2. The device according to claim 1 in which the said control pressure created in said second chamber (23, 23a) is a linear function of the degree of opening of said pressure limiting valve (12, 12a).

3. The device according to claim 1:
   (a) which includes first sensor means (38, 39) disposed and operable to detect operating parameters of the engine (2),
   (b) which includes second sensor means (40, 43) disposed and operable to detect an operating parameter of the regulating device (17, 41),
   (c) at least a portion of said valve means (31, 32; 42) being electrically operated,
   (d) said control means (34) being electronic and operable to send an electronic signal to said portion of said valve means in accordance with a predetermined function responsive to input data from said first sensor means (38, 39) and said second sensor means (40, 43).

4. The device according to claim 3 in which:
   (a) said engine (2) includes an accelerator (11),
   (b) said first sensor means (38, 39) is operable to detect the speed of revolution of said engine (2) and the position of said accelerator (11),
   (c) and said second sensor means (40) is operable to detect supercharging pressure of said engine (2).

5. The device according to claim 3 in which:
   (a) said engine (2) includes an accelerator (11), (b) said first sensor means (38, 39) is operable to detect the speed of revolution of said engine (2) and the position of said accelerator (11), (c) and said second sensor means (43) is operable to detect the degree of opening of said pressure limiting valve (12a).

6. The device according to claim 1 in which said valve means includes an electrically operated 3-way valve (42) which selectively assumes three working positions, (a) the first said position maintaining said second chamber (23a) closed in a fluid tight manner, (b) the second said position connecting said second chamber (23a) to the atmosphere, (c) and the third said position connecting said second chamber (23a) to said accumulator (36).

7. The device according to claim 1 in which said valve means includes two electrically operated 2-way valves (31, 32), (a) the first said 2-way valve (32):
  (1) having a first operating position connecting said second chamber (23) with atmosphere,
  (2) and having a second operating position which maintains said second chamber (23) isolated from atmosphere, (b) the second said 2-way valve (31):
  (1) having a first operating position connecting said second chamber (23) with said accumulator (36),
  (2) and having a second operating position isolating said second chamber (23) from said accumulator (36).

8. The device according to claim 1:

(a) wherein said engine (2) is of the spark-ignition type having an induction manifold constituting said accumulator (36), (b) and wherein the pressure within said accumulator (36) is less than atmospheric pressure.

9. The device according to claim 1:

(a) wherein said accumulator (36) comprises a vacuum servo braking system reservoir associated with said engine, (b) and wherein the pressure within said accumulator (36) is less than atmospheric pressure.

10. The device according to claim 1:

(a) wherein said accumulator (36) comprises a compressed air braking system reservoir associated with said engine, (b) and wherein the pressure within said accumulator (36) is greater than atmospheric pressure.

11. The device according to claim 3 which includes means associated with said control means (34) to regulate the degree of opening of said pressure limiting valve (12, 12a) so that the specific fuel consumption of said engine (2) is minimized.

12. The device according to claim 3 which includes means associated with said control means (34) to regulate the degree of opening of said pressure limiting valve (12, 12a) so that the emission of nitric oxides from said engine (2) is minimized.

13. The device according to claim 3 which includes means associated with said control means (34) to regulate the degree of opening of said pressure limiting valve (12, 12a) so that the emission of unburnt hydrocarbons is minimized.

* * * * *

UNITED STATES PATENT AND TRADEMARK OFFICE
CERTIFICATE OF CORRECTION

PATENT NO. : 4,597,264

DATED : July 1, 1986

INVENTOR(S) : GIOVANNI CIPOLLA

It is certified that error appears in the above-identified patent and that said Letters Patent is hereby corrected as shown below:

In Column 5, line 11, after "FIG. 1 and" insert --provided with a device 41 similar to the--

Signed and Sealed this

Seventh Day of October, 1986

[SEAL]

Attest:

DONALD J. QUIGG

Attesting Officer

Commissioner of Patents and Trademarks